No. 828,895. PATENTED AUG. 21, 1906.
C. F. MUELLER & H. R. BRAUNSDORF.
SCREW DRIVER AND OTHER HAND TOOL.
APPLICATION FILED OCT. 12, 1904.
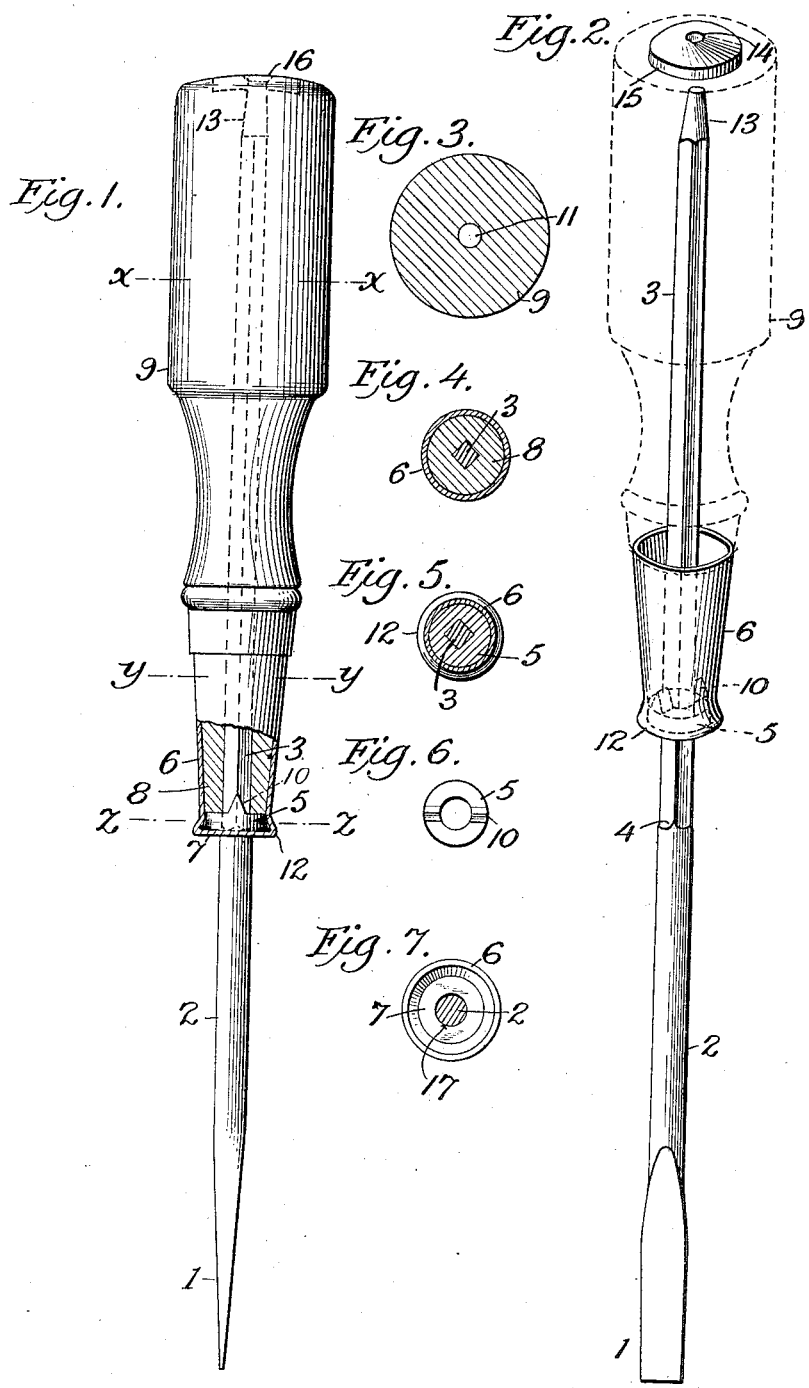

UNITED STATES PATENT OFFICE.

CHARLES F. MUELLER AND HENRY R. BRAUNSDORF, OF ELIZABETH, NEW JERSEY.

SCREW-DRIVER AND OTHER HAND-TOOL.

No. 828,895.　　　Specification of Letters Patent.　　　Patented Aug. 21, 1906.

Application filed October 12, 1904. Serial No. 228,179.

*To all whom it may concern:*

Be it known that we, CHARLES F. MUELLER and HENRY R. BRAUNSDORF, citizens of the United States, residing in Elizabeth, county of Union, and State of New Jersey, have invented certain new and useful Improvements in Screw-Drivers and other Hand-Tools, of which the following is a specification.

This invention relates to screw-drivers and other hand-tools of various kinds in which a metal blade is secured in a handle of wood or other material.

In many tools of this class, especially screw-drivers, the wooden handle is liable to become split either in use or by the operation of driving the same upon the metal tang during the manufacture of the tool. Moreover, the wooden handle, which is of relatively soft material, is liable after considerable hard usage to become loose and turn upon the blade, so that it is rendered useless.

The objects of the invention are to give the handle a firm grip upon the tang to avoid the liability of splitting the handle both during manufacture and in subsequent use, to prevent the possibility of the handle turning loosely upon the blade of a screw-driver, and to produce a tool which shall be not only highly finished and practically indestructible, but also of light weight in proportion to its strength, and which, moreover, may be made at reduced cost as compared with prior constructions.

In the accompanying drawings, Figure 1 shows a screw-driver, partly broken away, made in accordance with our invention. Fig. 2 is a perspective diagrammatic view illustrating the manner of assembling the parts. Fig. 3 is a cross-section of the handle on line $x\,x$ of Fig. 1, taken before the handle is forced upon the tang of the tool. Fig. 4 is a cross-section through line $y\,y$ of Fig. 1, showing ferrule, handle, and tang all in section. Fig. 5 is a cross-section through line $z\,z$ of Fig. 1, showing ferrule, bolster, and tang. Fig. 6 is a plan of a bolster provided with calks. Two calks are shown; but either more or less may be used within the scope of the invention. Fig. 7 is a plan of a tapering ferrule having a cylindrical perforation in its bottom to fit the cylindrical shank of the screw-driver.

The screw-driver may be formed by several methods, but the preferred method will be described. The blade may be formed from a cylindrical rod flattened at 1 to form the point and left full at 2 to form the shank. Above the shank the metal is formed by forging or otherwise into a square or other non-circular tang 3, tapering slightly from its base to its tip. The tang is reduced in size from the shank, so as to leave a shoulder at 4.

A ring or collar 5 is formed of somewhat softer metal than the tang, the former being preferably common steel and the latter tool-steel, the collar being undersized—that is, being too small to slip readily along the tang to the base thereof. Said collar is illustrated as formed with a round hole, although it may be otherwise shaped, and it is not essential in all cases that the collar have the cylindrical exterior shown. Said collar is placed in the bottom of a ferrule comprising a body portion 6, preferably tapering, and a bottom or head 7. Then the lower end 8 of a wooden or other handle 9 is forced into said ferrule and driven tightly against said collar. The ferrule may be drawn up from sheet-steel, and since it is very strong the fibers of the wood may be subjected to great compression in forcing on the ferrule. The collar is preferably provided with teeth or calks 10, which are forced to sink into the end of the handle, where they may be seen at Fig. 1. These calks aid materially in preventing relative rotation of handle and collar when the tool is in use.

The ferrule having been forced upon the handle, the tip of the tang is then inserted through the collar, and the tang is then by means of great force driven through the collar and the handle, the latter preferably having been originally provided with an under-sized central or axial perforation 11, Fig. 3, to receive the tang. By the action of the tapered tang upon the collar 5 the latter is somewhat expanded and shaped or fitted to the tang, the round hole becoming square or at least approaching a square form. The tang is forced in until arrested by the shoulder 4, so that the collar is braced against said shoulder and forms a bolster for the handle. The ferrule, which may be very strong, not only withstands the wedging action of the tang as it drives through the wood, whereby the fibers thereof are subjected to extra compression, but also affords a substantial support for the collar 5 against the tendency of the tang to break or distort the same unduly, and, if desired, the ferrule may be formed into a bead 12 to serve as a stiffening-flange around the bottom thereof.

Preferably the tang extends through the handle and at its tip is rounded and tapered at 13 to penetrate a central perforation 14, formed in a cap 15, the latter being countersunk in the head of the handle and riveted to the tang, as at 16. By means of this cap the handle is held solidly upon the tang and against the bolster and in engagement with the calks 10 thereof, while in case the screwdriver or other tool is hit with a hammer the blows fall upon the cap or the end of the tang and are transmitted directly through the metal to the point of the tool, so that the handle does not suffer.

The square tang of course alters the round hole 11 into a square hole, so that the handle throughout substantially its entire length may grip the tang with considerable force, so as to reduce the liability of becoming loose thereon, while the effect of the calks 10, which are driven into the end of the handle, is practically to prevent all possibility of the handle ever turning upon the blade, since the handle cannot turn against the holding action of the calks, and the bolster cannot turn upon the tang, while when the cap 15 is used the end of the handle cannot possibly lift off from the calks. The perforation 17 in the bottom of the ferrule fits closely upon the cylindrical shank 2, thereby conducing to the stiffness and elegant appearance of the device.

It will be perceived that a great advantage is gained by making the bolster separate from the blade or tang and separate from the ferrule. By making the bolster separate from the blade or tang a great saving is made in the construction of the blade and tang, while by having the bolster separately made from the ferrule it becomes practicable to use a ferrule made from sheet-steel or other sheet metal, which is lighter and far stronger than a cast ferrule, and, moreover, is cheaper and takes a far nicer finish, while the ferrule affords a substantial support for the ring during the forcing through of the tang, so that far greater force can be used and the tool can be made correspondingly stronger and more durable than where bolster and ferrule consist of a single piece of cast metal. The calks may, however, be used upon other bolsters than those made separately from the blade or separately from the ferrule.

Other variations may be resorted to within the scope of the invention—as, for instance, by putting the bottom of the ferrule between the bolster and the handle—and portions of the improvements may be used without others—as, for instance, the calk or calks may be omitted or the cap-plate upon the top of the handle may be omitted in some tools and the tang may not extend to the top of the handle.

Having thus described our invention, we claim—

1. A hand-tool comprising a blade and a tapering tang, a relatively thick bolster of slightly softer metal than the tang and having calks and driven upon said tang, a wooden handle driven upon said tang and forced against said bolster, the calks forced into the material of the handle, a relatively thin drawn sheet-metal ferrule having a bottom or end distinct from said bolster and forced upon the lower end of said handle, and a cap-plate upon the top of said handle, said tang extending through said cap-plate and being riveted thereto.

2. A hand-tool comprising a blade and a tapering tang, a relatively thick bolster of slightly softer metal than the tang and having calks and driven upon said tang, said bolster and tang being provided with interlocking means which prevent turning of the bolster on the tang, a wooden handle driven upon said tang and forced against said bolster, the calks forced into the material of the handle, and a relatively thin drawn sheet-metal ferrule having a bottom or end distinct from said bolster and forced upon the lower end of said handle.

3. A hand-tool comprising a blade and a tang, a relatively thick bolster of slightly softer metal than the tang and rigidly supported thereon against both turning movement and movement longitudinally of the tang and having calks, a wooden handle driven upon said tang and forced against said bolster, the calks forced into the material of the handle, and a relatively thin drawn sheet-metal ferrule having a bottom or end distinct from said bolster and forced upon the lower end of said handle.

4. A hand-tool comprising a blade and a tang, a relatively thick bolster of slightly softer metal than the tang and having calks and driven upon said tang, said bolster and tang being provided with interlocking means which prevent the turning of the bolster on the tang, a wooden handle driven upon said tang and forced against said bolster, the calks forced into the material of the handle, and a relatively thin drawn sheet-metal ferrule distinct from said bolster and forced upon the lower end of said handle.

5. A hand-tool comprising a blade and a tapering non-circular tang, the tang being of less thickness than the blade so that a shoulder is formed at the junction of the shank and blade, a relatively thick bolster of slightly softer metal than the tang and having calks and driven upon said tang and forced against said shoulder, a wooden handle driven upon said tang and forced against said bolster, the calks forced into the material of the handle, and a relatively thin drawn sheet-metal ferrule distinct from said bolster and forced upon the lower end of said handle.

6. A hand-tool comprising a blade and a tapering tang, a relatively thick bolster of slightly softer metal than the tang and having calks and driven upon said tang, a wooden handle driven upon said tang and forced against said bolster, the calks forced into the material of the handle, and a relatively thin drawn sheet-metal ferrule having a bottom or end distinct from said bolster and forced upon the lower end of said handle.

CHARLES F. MUELLER.
HENRY R. BRAUNSDORF.

Witnesses:
 HERMANN GACDKEY,
 OTTO ROST.